US011151904B1

(12) United States Patent
Zhou et al.

(10) Patent No.: US 11,151,904 B1
(45) Date of Patent: Oct. 19, 2021

(54) MULTI-FUNCTIONAL STRATIGRAPHIC STRUCTURE MODEL TESTING SYSTEM AND TESTING METHOD

(71) Applicants: University of Science and Technology Beijing, Beijing (CN); China Railway Tunnel Consultants Co., Ltd., Guangzhou (CN); Hebei Zhucheng Industrial and Mining Machinery Co., Ltd., Xingtai (CN)

(72) Inventors: Xiaomin Zhou, Beijing (CN); Yue Zhuo, Guangzhou (CN); Wenzhu Ma, Beijing (CN); Wei Li, Xingtai (CN); Yan Xu, Beijing (CN); Yongsheng Liu, Guangzhou (CN); Xiaonan He, Beijing (CN); Yue Wang, Guangzhou (CN); Yongdai Wang, Xingtai (CN); Shiwu Cai, Beijing (CN); Guijiang Wei, Beijing (CN); Xin Jiang, Beijing (CN); Zhiyuan Sha, Beijing (CN)

(73) Assignees: UNIVERSITY OF SCIENCE AND TECHNOLOGY BEIJING, Beijing (CN); CHINA RAILWAY TUNNEL CONSULTANTS CO., LTD., Guangzhou (CN); HEBEI ZHUCHENG INDUSTRIAL AND MINING MACHINERY CO., LTD., Xingtai (CN)

( * ) Notice: Subject to any disclaimer, the term of this patent is extended or adjusted under 35 U.S.C. 154(b) by 0 days.

(21) Appl. No.: 17/227,401

(22) Filed: Apr. 12, 2021

(30) Foreign Application Priority Data

Apr. 16, 2020 (CN) .......................... 202010302159.4

(51) Int. Cl.
*G06G 7/50* (2006.01)
*G09B 23/40* (2006.01)

(52) U.S. Cl.
CPC .................................... *G09B 23/40* (2013.01)

(58) Field of Classification Search
CPC ..................................................... G09B 23/40
(Continued)

(56) References Cited

U.S. PATENT DOCUMENTS 10,815,779 B2 * 10/2020 Morgan .................... G01N 1/14
2018/0031458 A1 * 2/2018 Jiang ....................... G01N 19/04

FOREIGN PATENT DOCUMENTS

CN 105890962 A 8/2016
CN 108169427 A 6/2018

OTHER PUBLICATIONS

Liu et al. (Model Test Study on Spatial Deformation Law of Surrounding Rock for Super-Large Section and Shallow Buried Tunnels) (Year: 2019).*

* cited by examiner

*Primary Examiner* — Andre Pierre Louis
(74) *Attorney, Agent, or Firm* — Bayramoglu Law Offices LLC

(57) ABSTRACT

Provided are a multi-functional stratigraphic structure model testing system and testing method. The system includes a test piece testing device platform that includes a watertight fan-shaped closed cavity, a fluid-solid coupling loading system, and an anti-arc reaction frame system. A coupling loading system region consist of hydraulic (liquid) loading and multi-directional solid-skeleton loading onto a pore or crack test piece, which can be independently operated or combined with each other's. The fan-shaped closed cavity is fixed through the anti-arc reaction frame system, and a fan-shaped center region is provided with an application region of underground working face. The other two flat fan (Continued)

B-B sides are provided with application regions of physical and chemical improvement for surrounding rock.

14 Claims, 5 Drawing Sheets

(58) Field of Classification Search
USPC .............................................. 703/6, 8, 9, 10
See application file for complete search history.

B-B

C-C

MULTI-FUNCTIONAL STRATIGRAPHIC STRUCTURE MODEL TESTING SYSTEM AND TESTING METHOD

CROSS REFERENCE TO THE RELATED APPLICATIONS

This application is based upon and claims priority to Chinese Patent Application No. 202010302159.4, filed on Apr. 16, 2020, the entire contents of which are incorporated herein by reference.

TECHNICAL FIELD

The present disclosure relates to the field of stratigraphic structure model testing research technologies, and, in particular, to a multi-functional stratigraphic structure model testing system and testing method.

BACKGROUND

With the development of urban underground space and deep resources, the difficulty of underground engineering design, construction and technology under complex geological conditions is increasing. Restricted by theoretical and technical conditions, a "load+structure" test mode of surface structures has been wrongly applied for mechanical performance tests of underground engineering structures since a long time. A loading method is of simple direct mechanical loading with single-direction jack. In fact, however, the underground engineering structures are far different from the surface structures with the following main features:

1) The existence of surrounding rock is not only an external load, but also a part of a bearing structure.

2) The underground engineering structures are often in complex multi-field coupling situations, such as a stress field, a temperature field, and a seepage field.

3) When the depth of underground engineering is more than 100 meters, the impermeability grade of concrete components commonly used in surface buildings often cannot meet the requirements of the underground engineering structures.

At present, the current situation of underground engineering structure simulation testing devices in domestic and abroad is as follows:

1) The functionality is simple and less while the reuse rate is low. Some are specially used for surrounding rock treatment, such as grouting, freezing, etc., some are specially used for underground structure stress features and strength testing, and some are specially used for mining shaft or traffic tunnel and other fields. The available model test equipment is poor for extensibility of test capability.

2) The reduction scale of model samples is normally too large, which leads to the distortion of underground structures and material characteristics. In the simulation test analysis, limited by many factors such as equipment space and loading capacity, the geometric reduction ratio of most tests has to be set too large, which leads to a series problem such as the dissimilarity of the structure and material characteristics of underground engineering, and the difficulty to select and place the monitoring sensors.

3) The loading structure is too simple, and the test device must be improved. At present, there are few testing devices at home and abroad that can implement mixed loading functions such as underground water pressure load, rock and soil solid load, and geological structure load. The joint design of device seal and loading system is the key point.

4) Due to the high integrity of the rock mass, it is not easy to cut and transport, so there are few model tests for real rock mass and surrounding rock, either there are fewer simulation material of overall rock mass of model test pieces.

5) Due to the heavy workload of indoor model test design and a long period of production and test cycle, it is difficult to carry out multi-factor and multi-level model testing research. And a single-function model test is too costly.

With the development of modern underground engineering, it is urgent to develop a model test platform that can truly reflect the interaction between surrounding rock and lining structures, and the performance of multi-field coupling environment, especially the coupling effect between groundwater and surrounding water-bearing rock.

SUMMARY

The technical problem to be solved by the present disclosure is to provide a multi-functional stratigraphic structure model testing system and testing method, so as to solve at least a part of the problems such as "large structure, single functionality, and inefficient system" of current underground engineering model tests, thereby ensuring "full-scale, strict scientific" underground engineering simulation tests. The multi-functional stratigraphic structure model testing system of the present disclosure is scientific, universal, and versatile, can break through industry differences of underground engineering problems, can be combined with a modern intelligent monitoring technology, an image information processing technology, a 3D model printing technology, a new material research and development technology, etc., to provide standardized testing research equipment for scientific research and engineering units, and provide a stronger testing research platform for the development of underground engineering.

In order to solve the above technical problems, the present disclosure provides the following technical solution:

A multi-functional stratigraphic structure model testing system, including a test piece testing device platform that includes a watertight fan-shaped closed cavity, a fluid-solid coupling loading system, and an anti-arc reaction frame system, wherein the fan-shaped closed cavity is provided with a permeable loading plate, and the permeable loading plate divides the fan-shaped closed cavity into a test piece mounting region and a coupling loading region, wherein the test piece mounting region is used for mounting a preset-type model test piece, and the coupling loading region is used for mounting the fluid-solid coupling loading system;

the fluid-solid coupling loading system comprises a hydraulic pumping pipeline, a hydraulic control valve, and an effective stress loading device, the hydraulic pumping pipeline is connected to the hydraulic control valve, and is used for performing hydraulic seepage loading on a rock and soil test piece in the fan-shaped closed cavity, so that cracks and pores inside the rock and soil test piece are filled with hydraulic load; and the effective stress loading device is used for performing effective stress loading in a preset direction on a model test piece in the test piece mounting region, so as to implement fluid-solid coupling loading of rock and soil;

the fan-shaped closed cavity is fixed through the anti-arc reaction frame system; and a center side of the fan-shaped closed cavity is provided with an underground working face operation region, and the other two flat sides are provided with a physical and chemical improvement application region for a surrounding rock test piece; and upper, lower, left, and right inner edges of the fan-shaped closed cavity are smooth inorganic coatings, and a surface of the test piece is made of tempered glass to achieve face seal of various boundaries.

The multi-functional stratigraphic structure model testing system further includes a test piece prefabrication platform matched with the test piece testing device platform; and the test piece prefabrication platform includes a machining tooling platform, a test piece mold, a 3D printer, and part-making equipment, wherein the machining tooling platform is fixed to the ground, is used for mounting the test piece mold and the part-making equipment, and is matched with the 3D printer;

the test piece mold is fixed to the machining tooling platform, and is matched with the shape and geometric size of the test piece mounting region; and the part-making equipment is mounted on the machining tooling platform in a sliding way, and the part-making equipment is located above the test piece mold and is movable in front, back, left and right directions relative to the test piece mold.

The anti-arc reaction frame system includes an internal anti-arc floor structure and an external anti-arc floor structure, wherein the internal anti-arc floor structure is used for fixing an outer cambered surface of the fan-shaped closed cavity, and the external anti-arc floor structure is used for fixing two lateral straight surfaces of the fan-shaped closed cavity.

A working face simulation device is detachably sealed and mounted in the underground working face operation region; and the working face simulation device is provided with a monitoring sensor of a preset type to monitor performance parameters of underground surrounding rock and a working face supporting structure.

The effective stress loading device includes a radial loading device, a top axial loading device, and a bottom axial loading device; and the radial loading device, the top axial loading device, and the bottom axial loading device are independent of each other, with load sizes freely combined, wherein the radial loading device is used for performing radial coupling loading on an outer cambered surface of the model test piece in a radial direction of the model test piece; the top axial loading device is used for performing coupling loading on a top surface of the model test piece in an axial direction of the model test piece; and the bottom axial loading device is used for performing coupling loading on a bottom surface of the model test piece in the axial direction of the model test piece.

The loading device includes a jack, a hydraulic loading bag, and a permeable loading plate connected to the hydraulic loading bag, wherein the permeable loading plates of the top axial loading device and the bottom axial loading device are provided with a physical and chemical simulation interface for treating surrounding rock of the model test piece.

The model test piece includes a top panel, a bottom panel, two lateral straight plates, an outer diameter arc plate, and an inner diameter arc plate, wherein the top panel, the bottom panel, and inner sides of the two lateral straight plates are made of rigid and smooth inorganic material coating materials; the outer diameter arc plate and the inner diameter arc plate are made of steel plates, the outer diameter arc plate and the inner diameter arc plate are respectively assembled with the top panel, the bottom panel, and the two lateral straight plates through detachable, self-locking and tight scarfing, and auxiliary bolts are detachably connected.

The permeable loading plate and the effective stress loading device are thicker and more rigid than the test piece, and a permeable hole on the permeable loading plate is sealable and removable to simulate a groundwater environment with engineering special bias flow.

A surface of the test piece fabricated by the test piece mold of the test piece prefabrication platform is made of smooth tempered glass.

Correspondingly, in order to solve the above technical problems, the present disclosure further provides the following technical solution:

A stratigraphic structure model testing method, including:

according to a to-be-simulated engineering project, establishing a simulation test model and determining a test piece material;

building the test piece prefabrication platform described above, and preparing a test piece according to the determined test piece material;

assembling the testing device platform described above, and mounting the prepared test piece;

conducting a test according to a set test scheme, and recording a test process and corresponding monitoring data information;

establishing a numerical model the same as the simulation test model, and calculating corresponding numerical calculation results;

optimizing numerical calculation conditions and parameters of the numerical model, so that the numerical calculation results are consistent with a model test; and based on the optimized numerical calculation conditions and parameters, establishing a real model, and taking calculation results of the real model as corresponding real test results.

The above technical solutions of the present disclosure have the following beneficial effects:

1) A multi-field coupling effect of underground engineering structures is implemented, and real engineering geological environments and corresponding surrounding rock reinforcement technologies are simulated to meet the requirements of model tests for the joint bearing capacity of surrounding rock and structures under the multi-field coupling effect.

2) With the help of an advanced image analysis technology, research and development achievements of new simulation materials, advanced 3D model printing equipment, etc., the production of model test pieces can be completed, theoretically covering the simulation production of all surrounding rock materials.

3) Through continuous improvement and standardized development of the stratigraphic structure model testing system of the present disclosure, the universality of the stratigraphic structure model testing system in underground engineering can be enhanced. It can be designed according to specific requirements such as size, function, load, and function, and become a regular teaching and scientific research platform.

4) Based on a scientific similarity criterion, calculation conditions and parameters of real engineering numerical calculation are optimized by comparing test results of the same-proportion similarity model with numerical calculation results. Therefore, multi-factor and multi-level model tests can be carried out by establishing variable numerical models, so that the number of concrete model tests can be greatly reduced and the cost of scientific research can be reduced.

DESCRIPTION OF REFERENCE NUMERALS

1. Fan-shaped closed cavity; 2. permeable loading plate; 3. test piece; 4. hydraulic control valve; 5. radial loading device; 6. top axial loading device; 7. bottom axial loading device; 8. physical and chemical simulation interface; 9. working face simulation device; 10. internal anti-arc floor structure; 11. external anti-arc floor structure; 12. test piece mold; 13. machining tooling platform; 14. part-making equipment.

DETAILED DESCRIPTION OF THE EMBODIMENTS

To make the technical problems to be solved by the present disclosure, the technical solutions and the advantages clearer, detailed description is provided below with reference to the accompanying drawings and specific embodiments.

First Embodiment

Figure 1:
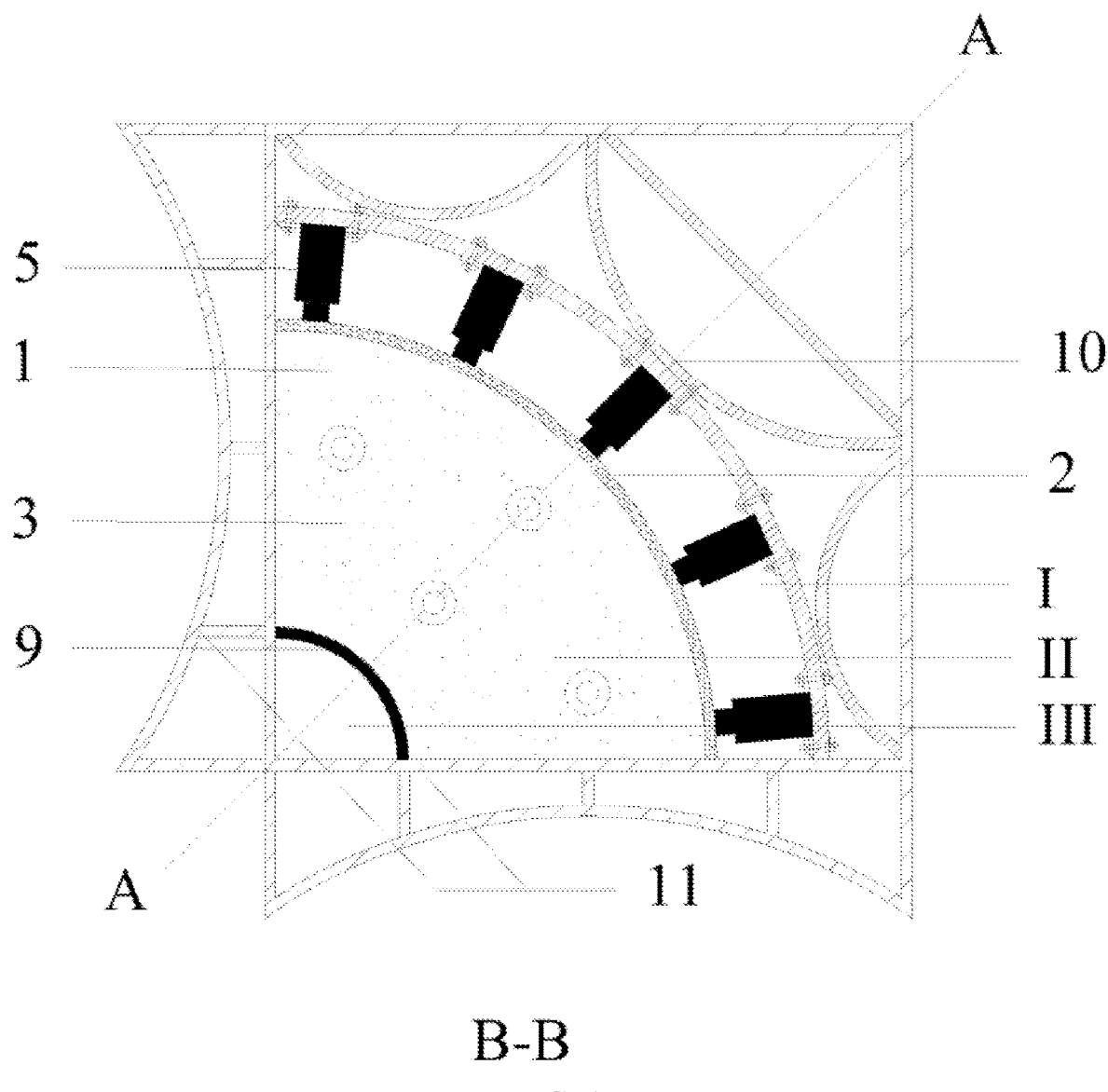
FIG. 1 is a schematic horizontal cross-sectional view of a test piece testing device platform provided by a first embodiment of the present disclosure.
Figure 2:
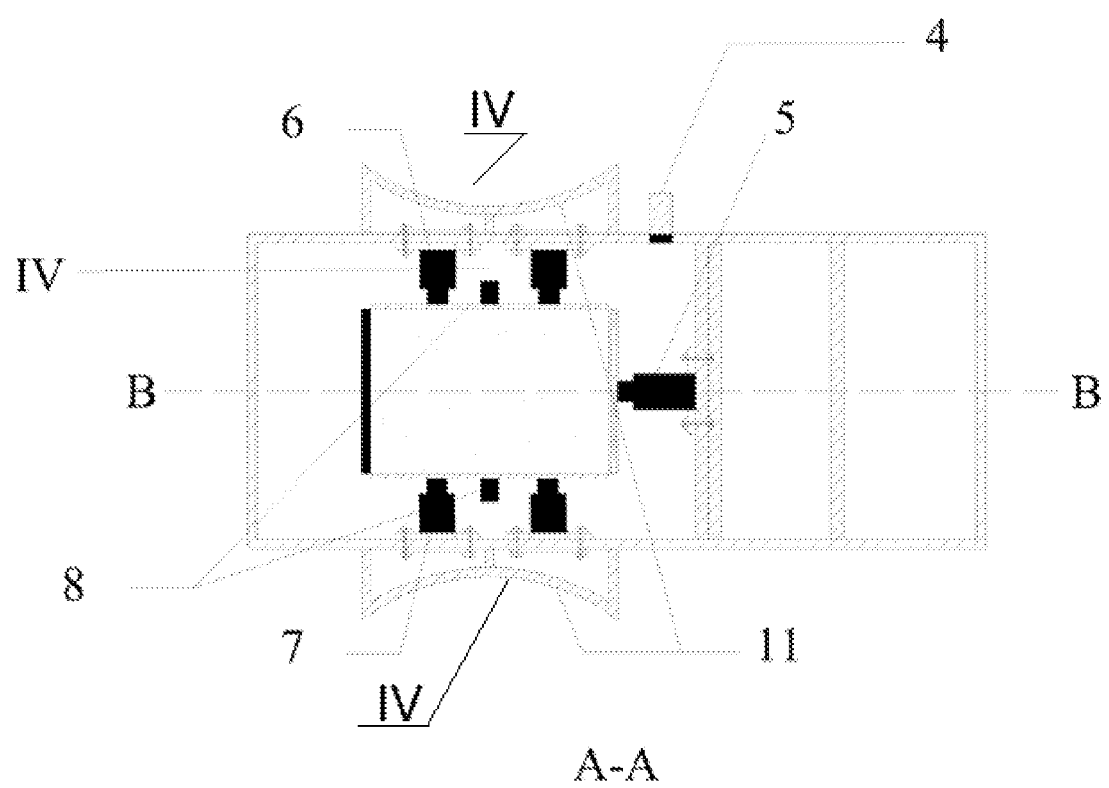
FIG. 2 is a schematic radial longitudinal sectional view of the test piece testing device platform provided by the first embodiment of the present disclosure.

Referring to FIG. 1 to FIG. 4, this embodiment provides a multi-functional stratigraphic structure model testing system. The system first includes a test piece testing device platform. The test piece testing device platform, as shown in FIG. 1 and FIG. 2, mainly includes: a fan-shaped closed cavity 1, a fluid-solid coupling loading system, and an anti-arc reaction frame system.

The fan-shaped closed cavity 1 is provided with a permeable loading plate 2. The permeable loading plate 2 divides the fan-shaped closed cavity 1 into two functional regions, which are respectively a test piece mounting region I and a coupling loading region II. The test piece mounting region I is used for mounting a preset-type model test piece 3. the test piece 3 includes both surrounding rock and structure. The coupling loading region II is used for mounting the fluid-solid coupling loading system.

The fluid-solid coupling loading system includes a hydraulic pumping pipeline, a hydraulic control valve 4, and a multi-directional effective stress loading device, which can be independent of or combined with each other. The hydraulic control valve 4 is used for performing hydraulic seepage loading on a rock and soil test piece in the fan-shaped closed cavity 1, so that cracks and pores inside the rock and soil test piece are filled with hydraulic load. The effective stress loading device is used for performing effective stress loading in a preset direction on the test piece 3 in the test piece mounting region I, so as to implement fluid-solid coupling loading of rock and soil. Specifically, in this embodiment, the effective stress loading device includes a radial loading device 5, a top axial loading device 6, and a bottom axial loading device 7. The loading devices in three different directions are independent of each other, with load sizes freely combined.

The radial loading device 5 is used for performing radial coupling loading on an outer cambered surface of the test piece 3 in a radial direction of the test piece 3. The top axial loading device 6 is used for performing coupling loading on a top surface of the test piece 3 in an axial direction of the test piece 3. The bottom axial loading device 7 is used for performing coupling loading on a bottom surface of the test piece 3 in the axial direction of the test piece 3. Each loading apparatus includes a jack, a hydraulic loading bag, and a permeable loading plate connected to the hydraulic loading bag. The loading plates of the top axial loading device 6 and the bottom axial loading device 7 are provided with a physical and chemical simulation interface 8 for treating surrounding rock of the test piece 3. The physical and chemical simulation interface 8 can simulate underground anchoring grouting and artificial freezing reinforcement in combination with other small equipment according to a test scheme.

The fan-shaped closed cavity 1 is fixed through the anti-arc reaction frame system; and a center side of the fan-shaped closed cavity 1 is provided with an underground working face operation region III. Adequate space is provided future researchers conducting model tests with a simulation working face to simulate underground engineering construction processes, such as masonry, anchoring, sprayed concrete, and grouting reinforcement. The other two flat sides are provided with a physical and chemical improvement application region IV for a surrounding rock test piece. Through reserved holes, the pipeline, and the control valve, operations such as drilling, coring, wall protection, pumping, and grouting can be performed in the surrounding rock.

Further, upper, lower, left, and right inner edges of the fan-shaped closed cavity 1 are smooth inorganic coatings, and a surface of the test piece is made of tempered glass to achieve face seal of various boundaries.

Further, in this embodiment, the permeable loading plate 2 is properly thickened at a loading position of the jack to ensure sufficient rigidity. The permeable loading plate 2 and the effective stress loading device are thicker and more rigid than the test piece 3, and a permeable hole on the permeable loading plate 2 is sealable and removable to simulate a groundwater environment with engineering special bias flow.

A working face simulation device 9 of a preset type is detachably sealed and mounted in the underground working face operation region III according to a test purpose, and is used for simulating the underground engineering construction processes. At the same time, the working face simulation device 9 is provided with a monitoring sensor to monitor performance parameters of underground surrounding rock and a working face supporting structure, including displacement, stress, strain, seepage, and temperature information.

In addition, the test device platform of this embodiment is designed according to an axially symmetric mechanical model, and the axial and radial loading devices are located in the closed cavity 1. The anti-arc reaction frame system is designed to fix the fan-shaped closed cavity 1 to meet the requirements of structure and test safety. The anti-arc reaction frame system includes an internal anti-arc floor structure 10 and an external anti-arc floor structure 11, which are mounted independently before the loading test.

The internal anti-arc floor structure 10 is used for fixing an outer cambered surface of the fan-shaped closed cavity 1, and the external anti-arc floor structure 11 is used for fixing two lateral straight surfaces of the fan-shaped closed cavity 1. The assembly of the fan-shaped closed cavity 1 is dominated by notch wedge extrusion structure connection and supplemented by bolt connection. After mounting, except a radial solid loading arc interface, other interfaces should meet normal rigid constraints.

Figure 3:
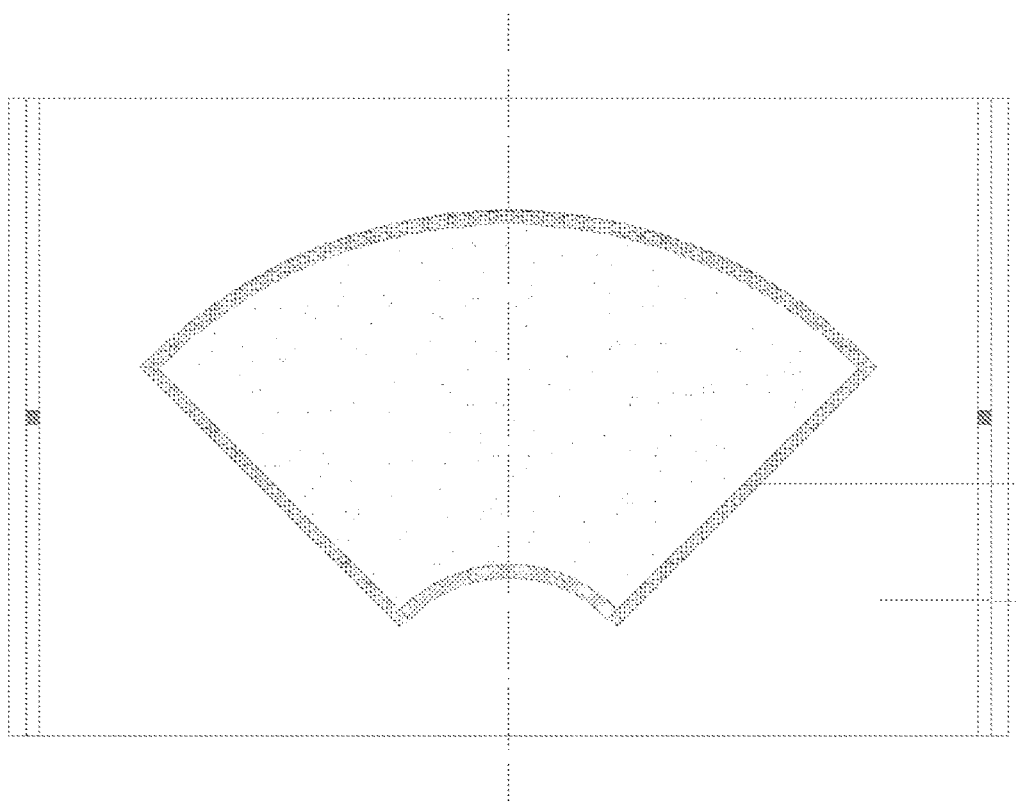
FIG. 3 is a schematic horizontal cross-sectional view of a test piece prefabrication platform provided by the first embodiment of the present disclosure.
Figure 4:
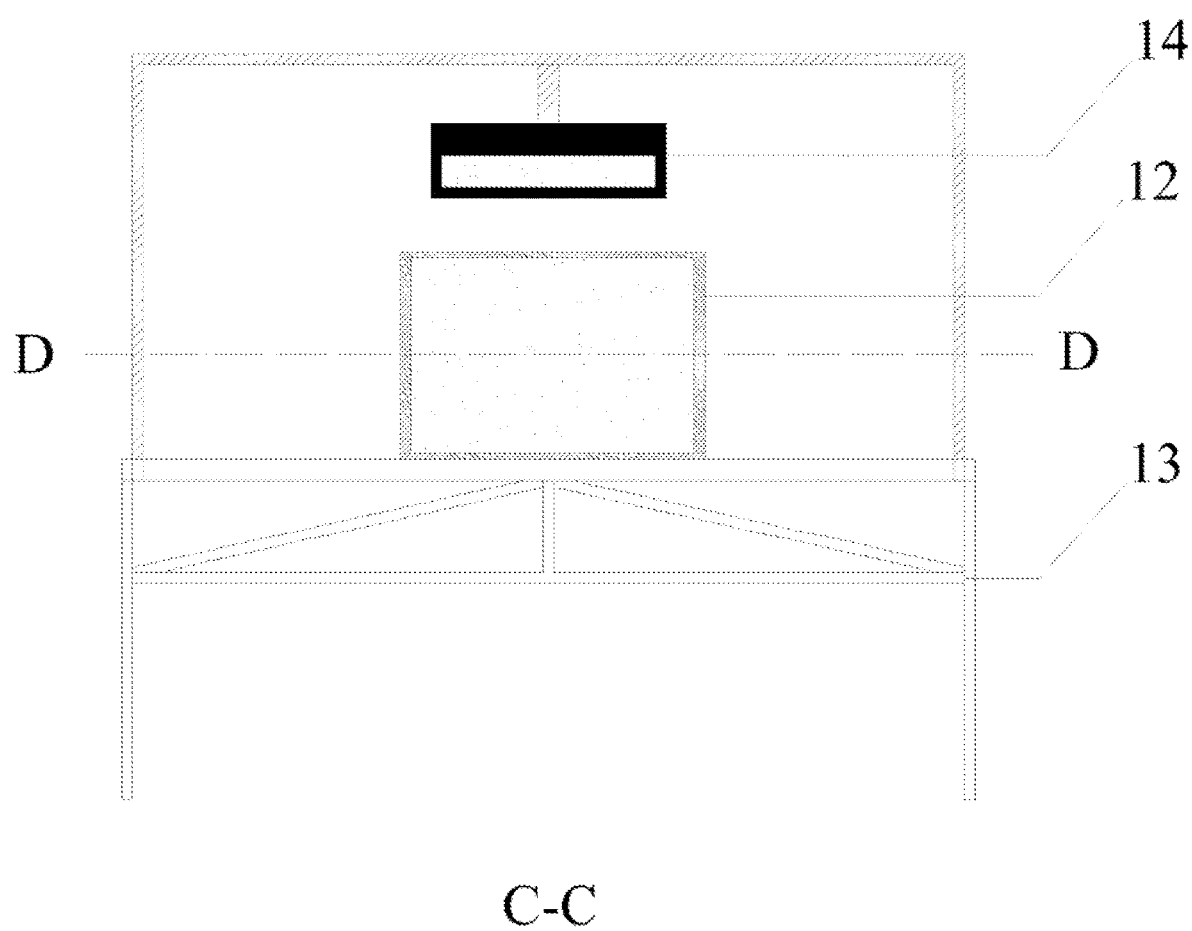
FIG. 4 is a schematic vertical longitudinal sectional view of the test piece prefabrication platform provided by the first embodiment of the present disclosure.

Further, the stratigraphic structure model testing system of this embodiment further includes a test piece prefabrication platform matched with the test piece testing device platform. The test piece prefabrication platform, as shown in FIG. 3 and FIG. 4, mainly includes a machining tooling platform 13, a test piece mold 14, a 3D printer, and part-making equipment 14.

The machining tooling platform 13 is fixed to the ground by bolts, is used for mounting the test piece mold 12 and the part-making equipment 14, and is matched with the 3D printer which is constantly developing in the future. The design meets the mounting space requirements of the test piece mold 12 and the part-making equipment 14, and has a certain maneuvering space.

The test piece mold 12 is fixed to the machining tooling platform 13 by bolts. In this embodiment, the test piece mold is a fan-shaped mold that accurately matches the geometric size and shape of the test piece mounting region I, and is designed to meet the tight contact between the test piece and the cavity structure. The model test piece includes a top panel, a bottom panel, two lateral straight plates, an outer diameter arc plate, and an inner diameter arc plate. The top panel, the bottom panel, and the two lateral straight plates are mainly made of toughened glass, to facilitate the inspection of the fabrication of the test piece. The top panel, the bottom panel, and inner sides of the two lateral straight plates are made of rigid and smooth inorganic material coating materials. The outer diameter arc plate and the inner diameter arc plate are made of steel plates, the outer diameter arc plate and the inner diameter arc plate are respectively assembled with the top panel, the bottom panel, and the two lateral straight plates through detachable, self-locking and tight scarfing, and auxiliary bolts are detachably connected. The shape of the arc plate can be designed according to a research purpose. In addition, the fan-shaped mold material has a smooth surface to ensure that the test piece is not affected by the friction of the template during the fabrication.

The part-making equipment 14 is mounted on the machining tooling platform 13 in a sliding way, is located above the test piece mold 12, and is movable in front, back, left and right directions relative to the test piece mold 12, to meet preparation requirements of different test pieces.

A test piece machining platform of this embodiment is based on the future development of 3D printing, and a fabrication template is made of inorganic materials such as toughened glass with the same performance as the test piece, which may be demoulded or not demoulded, but an outer surface of the test piece is smooth and meets the requirements of sealing. A surface of the test piece fabricated by the test piece mold 12 of the test piece prefabrication platform is made of smooth tempered glass with similar properties of geotechnical materials, which not only ensures that the boundary is sealed, but also achieves similar materials.

The stratigraphic structure model testing system in this embodiment is mainly used for stratigraphic structure model testing research under multi-field coupling loading conditions in underground engineering, which simulates multi-field coupling loading, lining structure support, surrounding rock anchor grouting, and artificial strata freezing. By means of similar theory, numerical simulation, 3D printing, information monitoring, and other advanced technologies, the system can be used for prospective and practical research on the interaction between complex underground engineering structure systems and surrounding rock structures under the multi-field coupling loading. The system can be designed in a parting way according to sizes, functions, loading, functions, and other specific requirements for standardized production, which can be used for model tests of strata and structures affected by multi-field coupling in complex geological environments.

Second Embodiment

Figure 5:
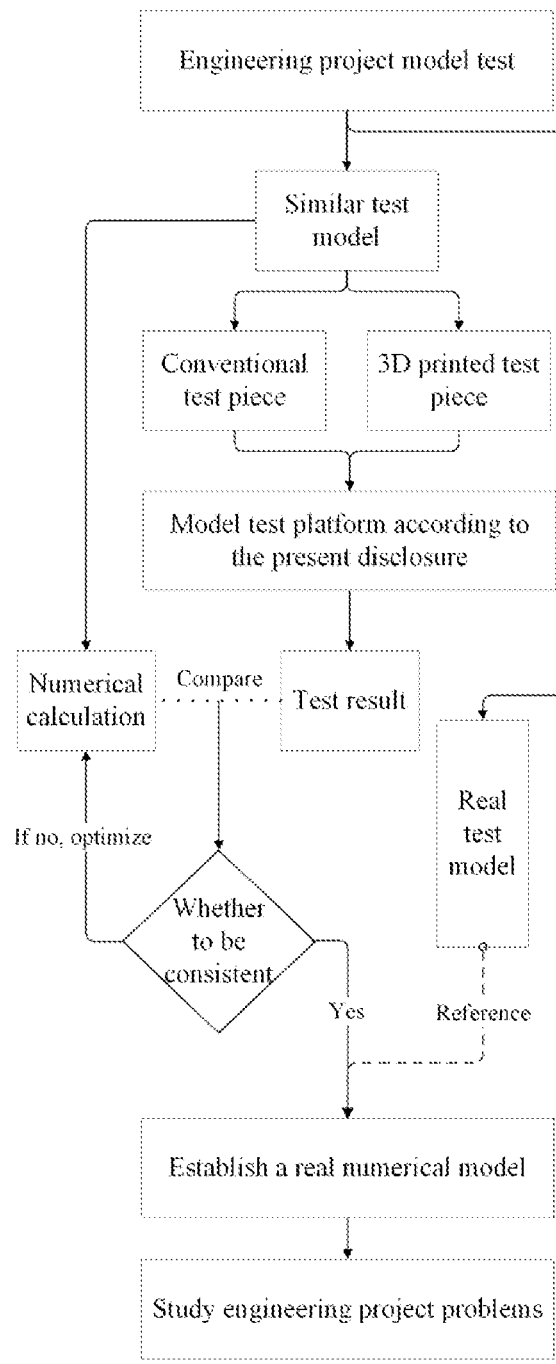
FIG. 5 is a schematic flowchart of a stratigraphic structure model testing method provided by a second embodiment of the present disclosure.

Referring to FIG. 5, this embodiment provides a stratigraphic structure model testing method. According to the test process in FIG. 5, an implementation scheme of an engineering model test is designed, which includes the following steps:

1. Basic engineering problems are clarified, a concrete real model is abstracted, and engineering simulation test items are determined.

2. A simulation test model is established, similar materials of a test piece are determined, and a test scheme is designed.

3. The test piece prefabrication platform as described in the above embodiment is set up to prepare the test piece.

1) The test piece mold 12 is fixed to the machining tooling platform 13.

2) The part-making equipment 14 is mounted on the test piece mold 12 in a sliding way.

3) After the part-making materials determined above are loaded into the part-making equipment 14, the test piece mold 12 makes a test piece. The test piece made is matched with the geometrical size of the test piece mounting region I of the fan-shaped closed cavity 1, and meets the tight contact between the test piece and the cavity structure.

4. The test device platform as described in the above embodiment is assembled, the test piece is mounted, and the structure is closed.

5. A test is conducted according to a set test scheme, and a test process and corresponding monitoring data information are recorded.

6. A numerical model the same as the simulation test model is established, and corresponding numerical calculation results are calculated.

7. Numerical calculation conditions and parameters are optimized, so that the numerical calculation results are consistent with a model test.

8. Based on the optimized numerical calculation conditions and parameters, a real model is established, and calculation results of the real model are taken as corresponding real test results.

9. This step completes the research process of obtaining real test results from the model test.

The properties of test piece materials for simulating underground surrounding rock and lining structures should conform to the similarity criteria of model tests. For rock mass materials that are difficult to be remold, 3D printing can be performed based on their macro and micro structural features. After related similar material research and 3D printing equipment are evaluated by experts, system mounting and test piece production can be carried out on the machining platform 13.

Moreover, the terms "include", "comprise", or their any other variants are intended to cover a non-exclusive inclusion, so that a process, a method, an article, or a terminal device that includes a list of elements not only includes those elements but also includes other elements that are not expressly listed, or further includes elements inherent to such a process, method, article, or terminal device. When there are no more restrictions, an element defined by the expression "including one . . . " does not exclude the presence of other similar elements in the process, method, article, or terminal device including the element.

It needs to be further noted that the above are preferred embodiments of the present disclosure. It should be indicates that the preferred embodiments of the present disclosure have been described; however, once knowing basic creative concepts, those of ordinary skill in the art can make other improvements and modifications without departing from the principle of the present disclosure. Such improvements and modifications should also be regarded as the protection scope of the present disclosure. Therefore, the appended claims are intended to be explained as including the preferred embodiments and all improvements and modifications falling within the scope of the embodiments of the present disclosure.

What is claimed is:

1. A multi-functional stratigraphic structure model testing system, comprising:
    a test piece testing device platform for a stratigraphic structure model testing under multi-field coupling loading conditions in an underground engineering, wherein the test piece testing device platform comprises a watertight fan-shaped closed cavity, a fluid-solid coupling loading system, and an anti-arc reaction frame system, wherein,
    the watertight fan-shaped closed cavity is provided with a permeable loading plate, and the permeable loading plate divides the watertight fan-shaped closed cavity into a test piece mounting region and a coupling loading region, wherein the test piece mounting region mounts a preset-type model test piece, and the coupling loading region mounts the fluid-solid coupling loading system;
    the fluid-solid coupling loading system comprises a hydraulic pumping pipeline, a hydraulic control valve, and an effective stress loading device;
    wherein the hydraulic pumping pipeline is connected to the hydraulic control valve, and performs a hydraulic seepage loading on a rock and soil test piece enclosed in the fan-shaped cavity, so that cracks and pores inside the rock and soil test piece are filled with a hydraulic water pressure load; and the effective stress loading device performs a solid skeleton stress loading in a preset direction on a model test piece in the test piece mounting region to implement a fluid-solid coupling loading of rock and soil,
        wherein the effective stress loading device comprises a radial loading device, a top axial loading device, and a bottom axial loading device; wherein the radial loading device, the top axial loading device, and the bottom axial loading device are independent of each other, with load sizes freely combined, wherein the radial loading device performs a radial coupling loading on an outer cambered surface of the model test piece in a radial direction of the model test piece; the top axial loading device performs a coupling loading on a top surface of the model test piece in an axial direction of the model test piece; and the bottom axial loading device performs a coupling loading on a bottom surface of the model test piece in the axial direction of the model test piece; the watertight fan-shaped closed cavity is fixed through the anti-arc reaction frame system; and
    a center side of the watertight fan-shaped closed cavity is provided as an underground working face operation region, and other two fan flat sides are provided as a physical and chemical improvement application region for a surrounding rock test piece; upper, lower, left, and right inner edges of the watertight fan-shaped closed cavity are smooth inorganic coatings, and a surface of the model test piece is made of tempered glass to achieve a face seal of various boundaries; and the anti-arc reaction frame system comprises an internal anti-arc floor structure and an external anti-arc floor structure, and the internal anti-arc floor structure and the external anti-arc floor structure are mounted independently before a loading test;
    wherein the internal anti-arc floor structure fixes an outer cambered surface of the watertight fan-shaped closed cavity, and the external anti-arc floor structure fixes two lateral straight surfaces of the watertight fan-shaped closed cavity; after mounting, except a radial solid loading arc interface, other interfaces meet normal rigid constraints.

2. The multi-functional stratigraphic structure model testing system according to claim 1, wherein the multi-functional stratigraphic structure model testing system further comprises a test piece prefabrication platform matched with the test piece testing device platform; and the test piece prefabrication platform comprises a machining tooling platform, a test piece mold, a 3D printer, and part-making equipment, wherein
    the machining tooling platform is fixed to the ground, is used for mounting the test piece mold and the part-making equipment, and is matched with the 3D printer;
    the test piece mold is fixed to the machining tooling platform, and is matched with a shape and a geometric size of the test piece mounting region; and
    the part-making equipment is mounted on the machining tooling platform in a sliding way, and the part-making equipment is located above the test piece mold and is movable in front, back, left and right directions relative to the test piece mold.

3. The multi-functional stratigraphic structure model testing system according to claim 1, wherein a working face simulation device is detachably sealed and mounted in the underground working face operation region; and the working face simulation device is provided with a monitoring sensor of a preset type to monitor performance parameters of underground surrounding rock and a working face supporting structure.

4. The multi-functional stratigraphic structure model testing system according to claim 1, wherein each of the radial loading device, the top axial loading device and the bottom axial loading device comprises a jack, a hydraulic loading bag, and a permeable loading plate connected to the hydraulic loading bag, wherein the permeable loading plates of the top axial loading device and the bottom axial loading device are provided with simulation interfaces for a physical and chemical treating of surrounding rock of the model test piece.

5. The multi-functional stratigraphic structure model testing system according to claim 2, wherein the model test piece comprises a top panel, a bottom panel, two lateral straight plates, an outer diameter arc plate, and an inner diameter arc plate, wherein the top panel, the bottom panel, and inner sides of the two lateral straight plates are made of rigid and smooth inorganic material coating materials; the outer diameter arc plate and the inner diameter arc plate are made of steel plates, the outer diameter arc plate and the inner diameter arc plate are respectively assembled with the top panel, the bottom panel, and the two lateral straight plates through a detachable, self-locking and tight scarfing, and auxiliary bolts are detachably connected.

6. The multi-functional stratigraphic structure model testing system according to claim 1, wherein the permeable loading plate and the effective stress loading device are thicker and more rigid than the model test piece, and a permeable hole on the permeable loading plate is sealable and removable to simulate a groundwater environment with an engineering special bias flow.

7. The multi-functional stratigraphic structure model testing system according to claim 2, wherein a surface of the model test piece fabricated by the test piece mold of the test piece prefabrication platform is made of smooth tempered glass.

8. A stratigraphic structure model testing method for a stratigraphic structure model testing under multi-field coupling loading conditions in an underground engineering, comprising:

according to a to-be-simulated engineering project, establishing a simulation test model and determining a test piece material;

building the test piece prefabrication platform according to claim 2, and preparing a test piece according to the determined test piece material;

assembling the test piece testing device platform, and mounting the prepared test piece;

conducting a test according to a set test scheme, and recording a test process and corresponding monitoring data information;

establishing a numerical model the same as the simulation test model, and calculating corresponding numerical calculation results;

optimizing numerical calculation conditions and parameters of the numerical model, so that the numerical calculation results are consistent with a model test; and based on optimized numerical calculation conditions and parameters, establishing a real model, and taking calculation results of the real model as corresponding real test results.

9. The stratigraphic structure model testing method according to claim 8, wherein a working face simulation device is detachably sealed and mounted in the underground working face operation region; and the working face simulation device is provided with a monitoring sensor of a preset type to monitor performance parameters of underground surrounding rock and a working face supporting structure.

10. The stratigraphic structure model testing method according to claim 8, wherein the effective stress loading device comprises a radial loading device, a top axial loading device, and a bottom axial loading device; and the radial loading device, the top axial loading device, and the bottom axial loading device are independent of each other, with load sizes freely combined, wherein the radial loading device is used for performing a radial coupling loading on an outer cambered surface of the model test piece in a radial direction of the model test piece; the top axial loading device is used for performing a coupling loading on a top surface of the model test piece in an axial direction of the model test piece; and the bottom axial loading device is used for performing a coupling loading on a bottom surface of the model test piece in the axial direction of the model test piece.

11. The stratigraphic structure model testing method according to claim 10, wherein each of the radial loading device, the top axial loading device and the bottom axial loading device comprises a jack, a hydraulic loading bag, and a permeable loading plate connected to the hydraulic loading bag, wherein permeable loading plates of the top axial loading device and the bottom axial loading device are provided with simulation interfaces for a physical and chemical treating of surrounding rock of the model test piece.

12. The stratigraphic structure model testing method according to claim 8, wherein the model test piece comprises a top panel, a bottom panel, two lateral straight plates, an outer diameter arc plate, and an inner diameter arc plate, wherein the top panel, the bottom panel, and inner sides of the two lateral straight plates are made of rigid and smooth inorganic material coating materials; the outer diameter arc plate and the inner diameter arc plate are made of steel plates, the outer diameter arc plate and the inner diameter arc plate are respectively assembled with the top panel, the bottom panel, and the two lateral straight plates through a detachable, self-locking and tight scarfing, and auxiliary bolts are detachably connected.

13. The stratigraphic structure model testing method according to claim 8, wherein the permeable loading plate and the effective stress loading device are thicker and more rigid than the model test piece, and a permeable hole on the permeable loading plate is sealable and removable to simulate a groundwater environment with an engineering special bias flow.

14. The stratigraphic structure model testing method according to claim 8, wherein a surface of the model test piece fabricated by the test piece mold of the test piece prefabrication platform is made of smooth tempered glass.

* * * * *